Fig. 2

Table I

| | Flow Rates (lb./hr.) | | | | Top Composition | | | Bottom Composition | | Conversion | | % HCN Loss | |
|---|---|---|---|---|---|---|---|---|---|---|---|---|---|
| | HCN | Cl₂ | H₂O | Steam | % CNCl | % Cl₂ | % HCN | % HCl | ppm HCN | HCN | CNCl | Hydrolysis | Unreacted |
| 1. | 3.0 | 9.0 | 60 | 13-14 | 84-94 | 6-15 | 0-4.4 | 4.2-5.2 | ND-800 | 85.7 | | 9.9 | 4.4 |
| 2. | 2.8 | 9.0 | 60 | 12.8 | 86-87 | 12-13 | ND* | 5.1-5.4 | ND | 100 | | 0 | 0 |
| 3. | 2.8 | 9.0 | 40 | 12.8 | 73-82 | 16-23 | 2.7-4.7 | 6.3-6.6 | ND | 89.5 | | 0 | 10.5 |
| 4. | 2.8 | 8.8 | 40 | 12.2 | 71-77 | 16-20 | 7.1-8.4 | 6.3-6.5 | 97-157 | 73.6 | | 0.08 | 26.3 |
| 5. | 2.8 | 8.8 | 40 | 12.8 | 88-93 | 6-12 | ND-1.6 | 7.3-7.9 | 2-10 | 96.9 | | 0.08 | 3.0 |
| 6. | 2.8 | 8.8 | 40 | 12.0 | 82-93 | 7-18 | ND-0.2 | 7.4-8.0 | 2-5 | 98.0 | | 0.01 | 1.9 |
| 7. | 2.8 | 8.8 | 35 | 12.0 | 89-90 | 8-15 | 1.0-2.2 | 9.3-9.5 | 5-13 | 95.9 | | 0.01 | 4.1 |
| 8. | 2.0 | 6.0 | 20 (HCl) 10.9% | 6.5 | 76-93 | 11-21 | 2.0-4.0 | 15-17 | 31-58 | 90.0 | | 1.2 | 8.8 |

* Not detectable

INVENTOR
WILLIAM J. EVERS
BY Wenderoth, Lind & Ponack
ATTORNEYS

United States Patent Office 3,499,738
Patented Mar. 10, 1970

3,499,738
METHOD AND APPARATUS FOR PRODUCING CYANOGEN CHLORIDE USING A MODIFIED OLDERSHAW REACTION COLUMN
William J. Evers, Mobile, Ala., assignor to Geigy Chemical Corporation, Ardsley, N.Y.
Filed Feb. 17, 1967, Ser. No. 616,874
Int. Cl. C01c 3/00
U.S. Cl. 23—359                                  4 Claims

ABSTRACT OF THE DISCLOSURE

An Oldershaw or perforated plate reaction column is modified by providing a cooling section in the lower middle of the column and a steam boiler in the bottom thereof, and chlorine is fed into the column below the cooling section and hydrogen cyanide is fed in just above the cooling section, while water or low concentration aqueous hydrochloric acid is fed into the top of the column. The heat of reaction is removed by the cooling section, cyanogen chloride is taken off the top of the column as a gas. The by-product aqueous hydrochloric acid is removed from the bottom of the column at concentrations up to 23%.

BACKGROUND OF THE INVENTION

Field of the invention

The invention relates to a method and apparatus for the production of cyanogen chloride, and more particularly it relates to the production of cyanogen chloride in an Oldershaw type of reactor column at higher acid conditions than heretofore thought possible.

Cyanogen chloride is a valuable intermediate for the production of cyanuric chloride, which in turn is useful as an intermediate for the manufacture of many products, such as chemotherapeutic agents, herbicides, dyes, brightening agents, synthetic resins, plastics, rubber, explosives and other materials.

DESCRIPTION OF THE PRIOR ART

A presently used commercial process of preparing cyanogen chloride for conversion into cyanuric chloride is described in U.S. Patent 3,197,273 in the name of Elwood Bruce Trickey. In this process, chlorine and hydrogen cyanide are charged into the reaction section of a packed column having a purification, washing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it is desired to produce, also produces at the bottom of the reactor column a by-product of dilute, i.e. 2–3% aqueous hydrochloric acid. This by-product is relatively easily disposed of when the quantity thereof is small, but in actual practice the amounts produced are so great that they cannot be disposed of simply by discharging into a stream or river without exceeding the amount which can be so discharged as established by pollution control standards. The alternative of concentrating the dilute hydrochloric acid and using it in other processes or selling it is not economically feasible since the costs of concentrating the dilute acid are greater than purchasing acid from commercial sources.

Production of cyanogen chloride under conditions which would produce the by-product aqueous hydrochloric acid at higher concentrations have heretofore appeared to be an unlikely solution to the problems of by-product disposal or by-product recovery because of the twin problems of intolerable, from the commercial standpoint, losses of the cyanogen chloride by hydrolysis and directly from the bottom of the reaction column along with the by-product hydrochloric acid. The necessity to keep hydrolysis losses low and substantially eliminate loss of hydrogen cyanide are essential to the successful commercial production of cyanogen chloride. A third essential condition is the prevention of the formation of $NCl_3$, which is extremely explosive and therefore an undesired reaction product not only from the standpoint of loss of the primary product but also from the standpoint of safety.

SUMMARY OF THE INVENTION

The present invention relates to a method and apparatus of overcoming the problems described above and carrying out the reaction of chlorine and hydrogen cyanide to produce cyanogen chloride by feeding the two raw materials into a so-called Oldershaw or perforated plate reaction column near the bottom thereof and extracting heat from the reaction zone by means of a cooling coil positioned in the reaction zone. By carefully controlling the conditions in the reaction column, a very high rate of conversion to cyanogen chloride can be achieved at low hydrolysis losses for the hydrogen cyanide and production of aqueous hydrochloric acid in concentrations up to 23%.

BRIEF DESCRIPTION OF THE DRAWINGS

The invention will be described in connection with the accompanying drawings, in which:

FIG. 2 is a table of the conditions and results obtained in carrying out the method of the invention.

DESCRIPTION OF THE PREFERRED EMBODIMENT

Figure 1:
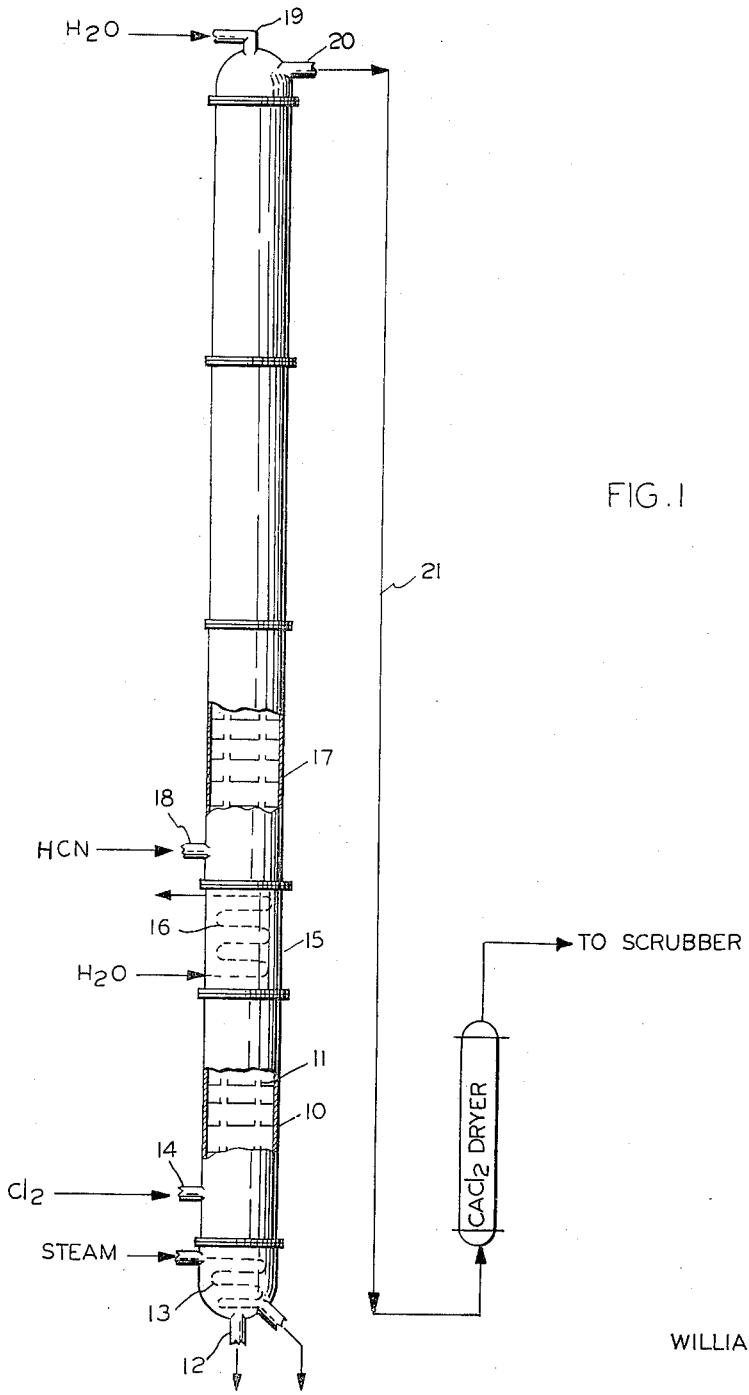
FIG. 1 is a schematic view of an Oldershaw type reaction column arranged to carry out the method of the present invention.

The reaction column in which the method of the invention is carried out comprises a lower or stripping section 10 having a plurality of perforated plates 11 therein and having an outlet 12 at the bottom thereof. Positioned in the bottom end of the lower section 10 is a steam reboiler 13. A chlorine inlet 14 is provided near the lower end of the lower section. Above the lower section 10 is positioned a cooling section 15 having a cooling coil 16 therein. An upper perforated section 17 is positioned above the cooling section 15, the upper perforated plate section also having a plurality of perforated plates therein and having an HCN inlet 18 in the lower portion thereof. At the top of the upper perforated plate section is a water inlet 19 and a primary product outlet 20. In actual practice, a conduit 21 extends from the primary product outlet 20 to a calcium chloride dryer 22 and thence to a scrubber (not shown).

In operating the reactor column to carry out the method, gaseous chlorine is fed into the lower perforated plate section 10 through the chlorine inlet 14 and gaseous or liquid hydrogen cyanide is fed into the upper perforated plate section 17 through the HCN inlet 18. The amount of chlorine is in excess of that which is theoretically necessary to convert all of the HCN to CNCl. Water is fed into the top of the column through the water inlet 19 and removes HCN from the CNCl rising through the upper section 17. Cooling water is circulated through the cooling coil 16 to remove the heat of reaction from the reaction section of the column, the main part of which reaction section lies between the HCN inlet 18 and the chlorine inlet 14. Steam is circulated through the steam coil of the steam reboiler 13 to heat the liquid in the stripping section of the reaction column to a temperature of about 102–110° C. to remove as much of the dissolved gaseous chlorine, HCN and CNCl as possible before the liquid is removed from the bottom of the column.

The temperature conditions in the column are maintained below those in the column used in the production of the CNCl in the process described in the above-mentioned patent. Sufficient cooling liquid is passed through the cooling coil 16 to keep the temperatures at the bottom and middle of the cooling section 15 between about 25 and 40° C., and the temperature at the top of the cooling section 15 between about 45 and 60° C. Immediately above the top of the cooling section 15 in the lower end of the upper perforated section 17 the temperature will rise due to the fact that a small part of the reaction will be taken place here, but it is preferred to control the conditions so that the temperature in the lower part of this section does not rise much above about 65 to 70° C. The amount of heat of reaction extracted in the cooling section 15 is sufficient so that with the transfer of heat from the upper perforated section 17 of the column and the cooling effect of the water fed into the top of the column, the temperatures within the upper perforated section fall rather rapidly higher up in the section, until at the top of the column the temperature has fallen to near 25° C. It is preferred to reach this temperature at the top of the column since at temperatures above this, not all of the HCN may be stripped out of the cyanogen chloride. To aid in reaching these conditions, the temperature of the water fed into the top of the column should be between 13–25° C., and preferably 15–20° C. Lower temperatures may cause liquification of the cyanogen chloride.

The amount of the reactants HCN and chlorine fed to the lower part of the column and the amount of the water fed to the top of the column are controlled to cause the reaction to be carried out so that the concentration of aqueous hydrochloric acid at the bottom of the column is up to 23%. The actual amounts used will depend mainly on the size of the column, and only small variations should be necessary to take into account the temperature of the water being fed to the top of the column. Temperature control of the reaction will be mostly by means of the cooling coil 16 and the temperature and amount of water passed therethrough.

In order to illustrate the invention more fully, a series of examples will be given for reaction columns of a specific size and configuration.

EXAMPLES 1–4

The lower stripping section 10 of the column was a single section Pyrex glass column 4 ft. long and 4 in. diameter, having 10 plates 96 mm. in diameter, each having 1000 holes therein with a diameter of 0.035 in. The reboiler 13 in the bottom of this section was a QVF glass type HEB4 having a heat transfer area of 1.5 sq. ft. and a jacket capacity of 2.5 liters, and capable of handling a maximum steam pressure of 50 lbs./sq. in. The cooler 15 was 2 ft. long and 4 in. diameter and was a QVF glass condenser type HE4 having a heat transfer area of 5 sq. ft. with a capacity of 4.5 liters and a maximum working pressure of 40 lbs./sq. in. The upper perforated plate section 17 was made up of two sections identical to the lower section 10.

The column was operated continuously over a period of 305 hours, by metering chlorine, HCN and water into the column at the rate set forth in Table 1 for four runs. Steam was maintained in the reboiler coils at 35 lbs./sq. in.

As can be seen, the composition of the gas taken out of the top of the column was high in CNCl, and had the desired amounts of chlorine therein. It should be pointed out here, as mentioned in the said U.S. Patent 3,197,273, that chlorine up to 15% should be contained in the cyanogen chloride in order to prevent the catalyst used in the subsequent preparation of cyanuric chloride from the cyanogen chloride from being poisoned. The presence of any excess of chlorine also has, of course, the advantage of assuring the completion of the desired reaction and reducing the amount of unreacted HCN in the final product and the hydrochloric acid in the bottom of the column.

On the other hand, the concentrations of hydrochloric acid in the by-product were from 4.2 to 6.6%. The hydrolysis losses were extremely low in the runs of Examples 2–4, while the conversion rate reached 100% in run 2.

EXAMPLES 5–7

The apparatus used in the runs of Examples 1–4 was changed by adding a third 4-ft. section to the upper perforated plate section. The conditions were otherwise the same. The thus modified column was operated at the rates set forth for runs 5–7 in Table 1.

The composition of the gas taken out of the top of the column was again highly satisfactory insofar as CNCl and chlorine content was concerned, but in addition, the amount of unreacted HCN was reduced to a relatively small amount. This is a significant improvement in that it represents a reduction in the loss of HCN as well as reducing the amount of this highly toxic material which must be handled in the final product of this process. The conversion rates also remained quite high while hydrolysis losses were very low. The concentration of acid increased up to 9.5% in run 7.

EXAMPLE 8

The same apparatus as was used in Examples 5–7 was operated under the same conditions, except that instead of feeding plain water to the top of the column, a 10.9% aqueous hydrochloric acid solution was fed. It will be seen that under these relatively highly acid conditions for run 8 in Table 1, the amount of chlorine in the CNCl gas taken off the top of the reactor was slightly on the high side, but that the efficiency of conversion was quite high and the acid produced at the bottom of the column had a concentration of from 15 to 17%.

There has thus been provided a modified Oldershaw type perforated plate column having a cooling section in the lower middle portion thereof and a method of operating the column to produce cyanogen chloride by reacting HCN and chlorine in the presence of water while extracting a large part of the heat of reaction from the reaction zone of the column and thereby enabling the by-product aqueous hydrochloric acid to be produced at a much higher concentration than heretofore. The more highly acid conditions under which the cyanogen chloride is produced do not, by operating the apparatus under the conditions of the method, cause any great drop in the efficiency of the process nor do they give undesirable characteristics to the resulting primary product. The more highly concentrated hydrochloric acid can be more easily converted into hydrochloric acid of a directly usable concentration, or can be used under some circumstances in the concentrations in which it comes from the bottom of the reaction column.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely a preferred embodiment thereof.

What is claimed is:

1. A method of making cyanogen chloride, comprising the steps of flowing water downwardly onto a first group of perforated plates of a perforated plate reactor and then through the perforations onto the next lower plate, flowing hydrogen cyanide into the downwardly flowing water and simultaneously flowing gaseous chlorine upwardly through the plates, flowing the water and hydrogen cyanide and any cyanogen chloride in solution therewith through a space below the first group of perforated plates and over one side of a heat exchange surface therein and then onto at least one further group of perforated plates and then through the perforations in said plates while flowing gaseous chlorine upwardly through the plates of said at least one further group of plates, the chlorine and hydrogen cyanide being fed in at least stoichiometric proportions, and controlling the temperature in said space by passing a heat exchange medium along the opposite side of the heat exchange surface for extracting a large part of the heat of reaction directly from the said space, the amount of water being sufficient for maintaining the hydrochloric acid produced at the bottom of the said at least one further group of perforated plates at a concentration of from about 5 to about 23%.

2. A method as claimed in claim 1 in which the temperature of the water introduced into the top of the column is from 13 to 25° C., and heat is added to the bottom of the column below the point of chlorine feed to keep the temperature at about 102–110° C., and the amount of heat extracted is sufficient to keep the temperatures in the reaction zone of the column below 60° C.

3. A method as claimed in claim 1 in which chlorine is fed in an amount which is in excess of that theoretically necessary to convert all of the hydrogen cyanide to cyanogen chloride.

4. A method of making cyanogen chloride, comprising the steps of flowing aqueous hydrochloric acid having a concentration of about 10.9% downwardly onto a first group of perforated plates of a perforated plate reactor and then through the perforations onto the next lower plate, flowing hydrogen cyanide into the downwardly flowing acid and simultaneously flowing gaseous chlorine upwardly through the plates, flowing the acid and hydrogen cyanide and any cyanogen chloride in solution therewith through a space below the first group of perforated plates and over a heat exchange surface therein and then onto at least one further group of perforated plates and then through the perforations in said plates while flowing gaseous chlorine upwardly through the plates of said at least one further group of plates, the chlorine and hydrogen cyanide being fed in at least stoichiometric proportions, and controlling the temperature in said space by passing a heat exchange medium along the opposite side of the heat exchange surface for extracting a large part of the heat of reaction directly from the said space, the amount of acid being sufficient for maintaining the hydrochloric acid produced at the bottom of the said at least one further group of perforated plates at a concentration of up to 23%.

References Cited

UNITED STATES PATENTS 2,672,398   3/1964   Huemer et al. _____ 23—359
3,197,273   7/1965   Trickey _____ 23—359

OSCAR R. VERTIZ, Primary Examiner

H. S. MILLER, Assistant Examiner

U.S. Cl. X.R.

23—75, 87, 263